United States Patent
Nagao et al.

(12) 
(10) Patent No.: US 11,022,369 B2
(45) Date of Patent: Jun. 1, 2021

(54) BOOSTER SYSTEM

(71) Applicant: MITSUBISHI HEAVY INDUSTRIES COMPRESSOR CORPORATION, Tokyo (JP)

(72) Inventors: Hideki Nagao, Hiroshima (JP); Masahiro Kobayashi, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 128 days.

(21) Appl. No.: 16/060,352

(22) PCT Filed: Feb. 9, 2016

(86) PCT No.: PCT/JP2016/000666
§ 371 (c)(1),
(2) Date: Jun. 7, 2018

(87) PCT Pub. No.: WO2017/138036
PCT Pub. Date: Aug. 17, 2017

(65) Prior Publication Data
US 2018/0363976 A1    Dec. 20, 2018

(51) Int. Cl.
*F25J 1/00*    (2006.01)
*B01J 3/02*    (2006.01)
(Continued)

(52) U.S. Cl.
CPC ............. *F25J 1/0027* (2013.01); *B01J 3/02* (2013.01); *F04B 15/08* (2013.01); *F04B 23/04* (2013.01);
(Continued)

(58) Field of Classification Search
CPC ........ F25J 1/0027; F25J 1/0095; F25J 1/0254; F25J 1/0257; F25J 3/0266; F25J 2205/01;
(Continued)

(56) References Cited

U.S. PATENT DOCUMENTS 6,164,901 A * 12/2000 Blotenberg ............. F04D 27/02
                                                           415/1
6,220,053 B1 * 4/2001 Hass, Jr. ................. F25J 1/0015
                                                           62/613
(Continued)

FOREIGN PATENT DOCUMENTS

CA    2317539 A1 *  7/1999 ............... F25J 3/062
CA    2764636 A1 * 12/2010 ............. F25J 3/0233
(Continued)

OTHER PUBLICATIONS

International Search Report issued in corresponding International Application No. PCT/JP2016/000666 dated May 10, 2016, with translation (8 pages)
(Continued)

*Primary Examiner* — Len Tran
*Assistant Examiner* — Jenna M Hopkins
(74) *Attorney, Agent, or Firm* — Osha Bergman Watanabe & Burton LLP

(57) ABSTRACT

A booster system for increasing pressure of an object gas includes: a first compression unit that compresses the object gas to intermediate pressure equal to or higher than the critical pressure and lower than the target pressure and generates an intermediate supercritical fluid; a cooling unit that cools the intermediate supercritical fluid with a cooling medium and generates an intermediate supercritical pressure liquid; a liquid extracting and pressure reducing unit that extracts a part of the intermediate supercritical pressure liquid; a flow regulating valve that regulates a flow rate of the extracted part of the intermediate supercritical pressure liquid; a second compression unit that increases pressure of the rest of the intermediate supercritical pressure liquid to be equal to or higher than the target pressure; and a pressure
(Continued)

sensor that detects pressure of the intermediate supercritical pressure liquid.

16 Claims, 6 Drawing Sheets

(51) Int. Cl.
| | |
|---|---|
| *F04B 41/06* | (2006.01) |
| *F04D 27/00* | (2006.01) |
| *F25J 3/06* | (2006.01) |
| *F25J 3/02* | (2006.01) |
| *F04B 23/04* | (2006.01) |
| *F04B 49/06* | (2006.01) |
| *F04B 49/22* | (2006.01) |
| *G05D 16/20* | (2006.01) |
| *F04B 39/06* | (2006.01) |
| *F04B 15/08* | (2006.01) |
| *F25J 1/02* | (2006.01) |

(52) U.S. Cl.
CPC .............. *F04B 39/06* (2013.01); *F04B 41/06* (2013.01); *F04B 49/065* (2013.01); *F04B 49/22* (2013.01); *F04D 27/00* (2013.01); *F25J 1/0032* (2013.01); *F25J 1/0254* (2013.01); *F25J 1/0257* (2013.01); *F25J 3/0266* (2013.01); *F25J 3/067* (2013.01); *G05D 16/20* (2013.01); *F04B 2015/0818* (2013.01); *F04B 2205/01* (2013.01); *F25J 2230/04* (2013.01); *F25J 2230/20* (2013.01); *F25J 2230/80* (2013.01); *F25J 2235/80* (2013.01); *F25J 2270/02* (2013.01); *F25J 2270/80* (2013.01); *F25J 2280/02* (2013.01); *Y02C 20/40* (2020.08)

(58) Field of Classification Search
CPC .. F25J 2230/04; F25J 2230/20; F25J 2230/80; F25J 2235/80; F25J 2270/02; F25J 2270/80; F25J 2280/02; B01J 3/02
See application file for complete search history.

(56) References Cited

U.S. PATENT DOCUMENTS

| | | | | |
|---|---|---|---|---|
| 6,591,632 B1* | 7/2003 | Mahoney | ............... | F25J 1/0052 62/613 |
| 6,755,620 B2* | 6/2004 | Nakamura | .......... | F04D 27/0261 417/2 |
| 8,591,199 B2* | 11/2013 | Martinez | ............... | F04C 23/001 417/199.2 |
| 8,683,824 B2* | 4/2014 | Madison | ............... | F16K 11/074 62/51.2 |
| 9,022,747 B2* | 5/2015 | Fletcher | .................. | F04D 17/14 417/53 |
| 9,360,002 B2* | 6/2016 | Sassanelli | ............. | F04D 25/163 |
| 10,190,600 B2* | 1/2019 | Nagao | ..................... | F04B 41/06 |
| 10,400,776 B2* | 9/2019 | Grassens | ............... | F04D 29/444 |
| 10,570,927 B2* | 2/2020 | Nagao | ...................... | F25J 3/067 |
| 2009/0317260 A1* | 12/2009 | Mirsky | ................... | F01D 15/08 417/29 |
| 2011/0008186 A1* | 1/2011 | Palomba | ............... | F04D 29/059 417/247 |
| 2013/0119666 A1* | 5/2013 | Holt | ....................... | F25J 1/0244 290/52 |
| 2013/0156543 A1* | 6/2013 | Sassanelli | ........... | F04D 29/5826 415/1 |
| 2013/0291722 A1* | 11/2013 | Stallmann | ............ | B01D 53/002 95/134 |
| 2014/0026612 A1* | 1/2014 | Demolliens | ............ | F25J 1/0255 62/613 |
| 2014/0069141 A1* | 3/2014 | Yonemura | .............. | F25J 1/0027 62/606 |
| 2015/0176892 A1* | 6/2015 | Darde | ..................... | C01B 32/55 62/602 |
| 2015/0308735 A1* | 10/2015 | Thom | .................... | F25J 3/0209 62/623 |
| 2016/0018159 A1* | 1/2016 | Naito | .................... | B01D 53/002 62/617 |
| 2016/0123351 A1* | 5/2016 | Nagao | ...................... | F25J 3/067 415/1 |
| 2018/0313603 A1* | 11/2018 | Nagata | .................... | F25J 1/0281 |
| 2018/0363976 A1* | 12/2018 | Nagao | .................. | F04B 49/065 |
| 2019/0003425 A1* | 1/2019 | Pages | ....................... | F25J 1/027 |

FOREIGN PATENT DOCUMENTS

| | | | | | |
|---|---|---|---|---|---|
| EP | 1031803 | A2 * | 8/2000 | ............. | F25J 3/0233 |
| JP | 03236589 | A * | 10/1991 | ............... | F25J 1/004 |
| JP | 5826265 | B2 | 12/2015 | | |
| WO | WO-2011010111 | A2 * | 1/2011 | ............. | F25J 3/0625 |
| WO | WO-2012174418 | A1 * | 12/2012 | ............... | F25J 3/067 |
| WO | 2015/107615 | A1 | 7/2015 | | |
| WO | WO-2015107615 | A1 * | 7/2015 | ......... | F04D 15/0005 |
| WO | WO-2016092178 | A1 * | 6/2016 | ............. | F25J 3/0266 |

OTHER PUBLICATIONS

Written Opinion of the International Searching Authority issued in corresponding International Application No. PCT/JP2016/000666 dated May 10, 2016 (4 pages).

* cited by examiner

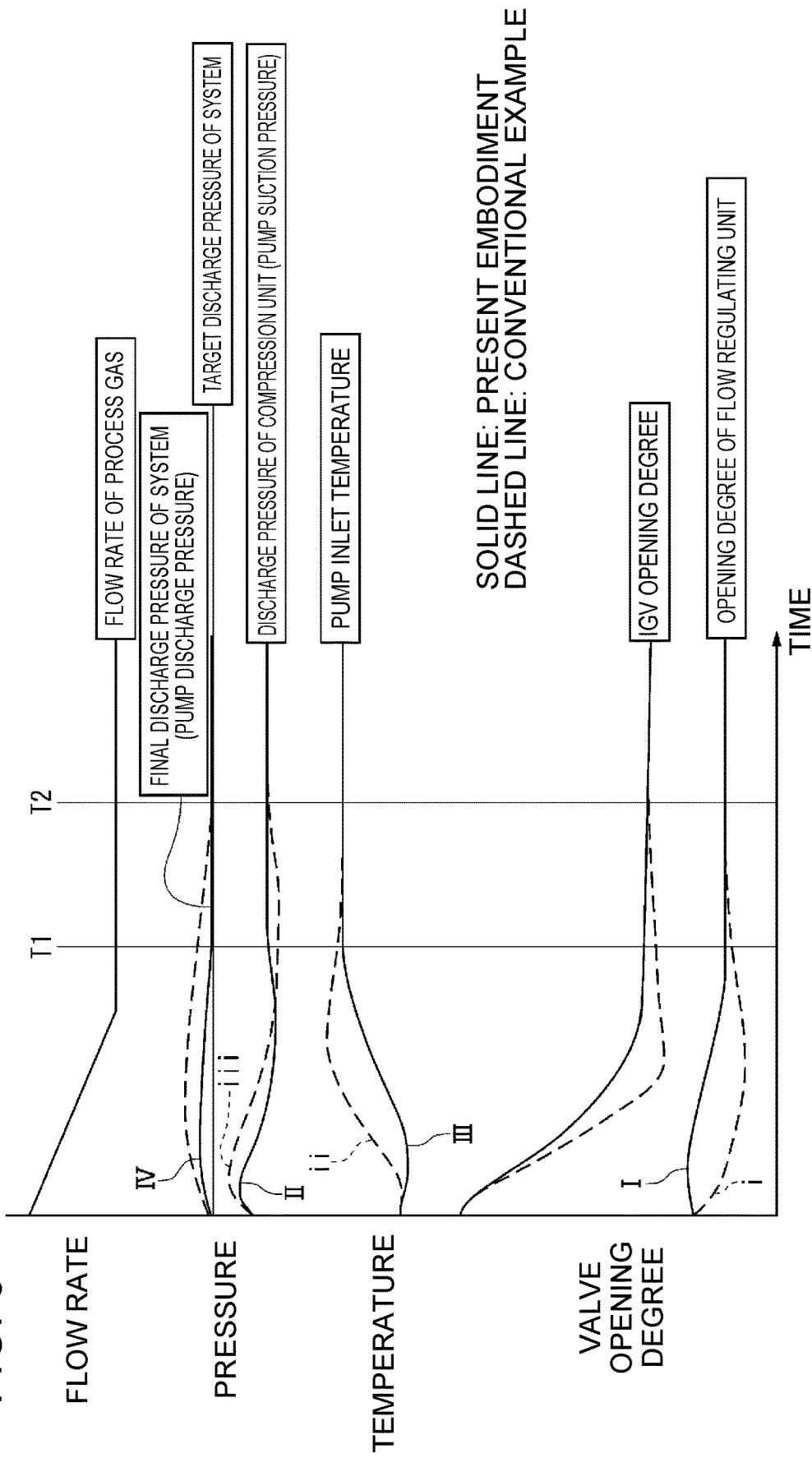

BOOSTER SYSTEM

TECHNICAL FIELD

The present invention relates to a booster system for increasing pressure of a gas.

BACKGROUND

A booster system is a device for increasing pressure of an object gas to target pressure, and a technology is considered of using the booster system to increase pressure of carbon dioxide and store the carbon dioxide under the ground or under the seafloor, thereby reducing carbon dioxide in atmosphere. In recent years, problems such as global warming have become apparent due to an increase in emission of carbon dioxide known as greenhouse gases, and separating and collecting carbon dioxide contained in emission gases, for example, from a thermal power plant and then increasing pressure of the carbon dioxide using a booster system has been considered.

In this booster system, a compressor configured in a multistage structure is used to gradually compress carbon dioxide, and the carbon dioxide in a state at supercritical pressure and temperature or higher is cooled to obtain carbon dioxide at target temperature and pressure optimum for transportation and storage. As such a booster system, systems disclosed in Patent Literatures 1 and 2 are known.

The booster systems disclosed in Patent Literatures 1 and 2 each mainly include a compression unit, a cooling unit, and a pump unit. The compression unit compresses an object gas to intermediate pressure equal to and higher than critical pressure and lower than target pressure to generate an intermediate supercritical fluid. The cooling unit cools the intermediate supercritical fluid generated by the compression unit to around a critical temperature to generate an intermediate supercritical pressure liquid. The pump unit increases pressure of the intermediate supercritical pressure liquid generated by the cooling unit to target pressure or higher. The cooling unit extracts a part of the intermediate supercritical fluid generated by the compression unit and supplied into the pump unit and uses the part of the intermediate supercritical fluid as a cooling medium.

In Patent Literature 2, a cooling temperature regulating unit is provided upstream of the pump unit to regulate a temperature of an intermediate supercritical pressure liquid generated by the cooling unit, and constantly control discharge pressure of a target supercritical fluid finally generated, that is, final discharge pressure to target pressure. More specifically, in Patent Literature 2, a pressure detection unit that detects pressure of the target supercritical fluid (carbon dioxide) having passed through a heating unit provided on a downstream side of the pump unit, and a flow regulating valve that regulates an amount of the cooling medium (intermediate supercritical fluid) supplied into the cooling unit are provided, and an opening degree of the flow regulating valve is regulated based on a deviation between a detection value detected by the pressure detection unit and a predetermined pressure range. As such, in Patent Literature 2, the temperature of the intermediate supercritical pressure liquid generated by the cooling unit and sucked into the pump unit (pump inlet temperature) is regulated. In Patent Literature 2, the pressure of the carbon dioxide heated by the heating unit is the final discharge pressure of the booster system.

CITATION LIST

Patent Literature

Patent Literature 1: JP 5826265 B2
Patent Literature 2: International Publication No. 2015/107615

In the above booster systems, an operation with a partial load is sometimes performed in which an amount of carbon dioxide supplied is smaller than that at a rated operation point. Also in this partial load operation, the final discharge pressure is constantly controlled to target pressure. In Patent Literature 2, the following procedure is taken to constantly control the final discharge pressure in response to the partial load operation. Specifically, the flow regulating valve that regulates a flow rate of the cooling medium supplied into the cooling unit is closed to reduce the flow rate of the cooling medium and increase an inlet temperature of the pump unit, thereby trying to reduce the final discharge pressure. At this time, the flow rate of the cooling medium flowing into the cooling unit is reduced, but the flow rate of the cooling medium flowing into the pump unit is increased instead. Thus, the discharge pressure of the compression unit and the final discharge pressure of the system are more likely to increase, making it difficult to quickly reduce the final discharge pressure. This is because response of a temperature change in a heat exchanger that constitutes the cooling unit is slower than response of a pressure change due to a flow rate change in the booster system.

One or more embodiments of the present invention provide a booster system capable of quickly reducing and controlling final discharge pressure to target pressure even in a partial load operation. For example, one or more embodiments of the present invention provide a booster system for increasing pressure of an object gas to pressure equal to or higher than target pressure that is higher than critical pressure, including: a first compression unit that compresses the object gas to intermediate pressure equal to or higher than the critical pressure and lower than the target pressure to generate an intermediate supercritical fluid; a cooling unit that extracts a part of the intermediate supercritical fluid generated by the first compression unit and uses the part of the intermediate supercritical fluid as a cooling medium, and cools the intermediate supercritical fluid generated by the first compression unit to generate an intermediate supercritical pressure liquid; a second compression unit that increases pressure of the intermediate supercritical pressure liquid generated by the cooling unit to a pressure equal to or higher than the target pressure; a first flow regulating valve that regulates a flow rate of the cooling medium into the cooling unit, the cooling medium being obtained by extracting the part of the intermediate supercritical fluid generated by the first compression unit; and a first pressure sensor that detects pressure of the intermediate supercritical pressure liquid on an inlet side of the second compression unit.

The booster system of one or more embodiments of the present invention is characterized in that an opening degree of the first flow regulating valve is regulated based on a detection result of the first pressure sensor.

The booster system of one or more embodiments of the present invention may include: a second flow regulating valve that regulates a suction flow rate of the object gas in the first compression unit; and a second pressure sensor that detects pressure on an outlet side of the second compression unit, wherein an opening degree of the second flow regulating valve is regulated based on a detection result of the second pressure sensor.

The booster system of one or more embodiments of the present invention may include a first control unit ("control unit" used interchangeably with "controller") that controls the opening degree of the first flow regulating valve based on the detection result of the first pressure sensor, wherein the first control unit includes a first determination unit that determines whether or not the detection result of the first pressure sensor falls within a predetermined pressure range, and a first opening degree decision unit that decides the opening degree of the first flow regulating valve based on a determination result of the first determination unit.

The booster system of one or more embodiments of the present invention may include a second control unit that controls the opening degree of the second flow regulating valve based on the detection result of the second pressure sensor, wherein the second control unit includes a second determination unit that determines whether or not the detection result of the second pressure sensor falls within a predetermine pressure range, and a second opening degree decision unit that decides the opening degree of the second flow regulating valve based on a determination result of the second determination unit.

In the booster system of one or more embodiments of the present invention, the first compression unit may include one or more stages of compressors, and the second compression unit may include one or more stages of pumps.

In the booster system of one or more embodiments of the present invention, when the first compression unit includes one or more stages of compressors, the second flow regulating valve may be provided in association with the compressor located most upstream or provided in association with the compressor located downstream of the most upstream position with reference to a flow direction of the object gas.

In the booster system of one or more embodiments of the present invention, the second compression unit may increase pressure of the intermediate supercritical pressure liquid to generate a target supercritical fluid.

In the booster system of one or more embodiments of the present invention, the first flow regulating valve may reduce pressure of the extracted part of the intermediate supercritical fluid to generate a liquid or gas-liquid two-phase cooling medium.

The booster system of one or more embodiments of the present invention may include a bypass flow path through which the cooling medium used for cooling by the cooling unit is returned to the first compression unit.

According to the booster system of one or more embodiments of the present invention, the opening degree of the first flow regulating valve that regulates the flow rate of the cooling medium obtained by extracting the part of the intermediate supercritical fluid supplied into the cooling unit is regulated based on suction side pressure detected on the inlet side of the second compression unit. Increasing the opening degree of the first flow regulating valve, that is, opening the first flow regulating valve increases the flow rate of the cooling medium obtained by extracting the part of the intermediate supercritical fluid flowing into the cooling unit, while reduces the flow rate of the intermediate supercritical fluid flowing into the second compression unit. Specifically, the booster system of one or more embodiments of the present invention regulates the opening degree of the first flow regulating valve to control discharge pressure of the first compression unit. Thus, if the system is in a partial load operation state, the first flow regulating valve is once opened to reduce the flow rate of the intermediate supercritical fluid flowing into the second compression unit, thereby trying to reduce the discharge pressure of the first compression unit. This increases the flow rate of the cooling medium obtained by extracting the part of the intermediate supercritical fluid flowing into the cooling unit, reduces the inlet temperature of the second compression unit, and starts to increase the discharge pressure of the second compression unit, that is, final discharge pressure. However, since response of a pressure change due to a flow rate change in the system is faster than response of a temperature change in the cooling unit, typically, a heat exchanger, the reduction in the inlet temperature of the second compression unit has a low impact on the increase in the final discharge pressure. As a result, according to one or more embodiments of the present invention, the increase in the final discharge pressure can be prevented to allow quicker control to the target pressure.

BRIEF DESCRIPTION OF DRAWINGS

FIG. 6 illustrates an operation of the booster system according to one or more embodiments.

DETAILED DESCRIPTION OF EMBODIMENTS

Now, with reference to the accompanying drawings, embodiments of a booster system according to the present invention will be described.

A booster system 1 according to one or more embodiments is a system for increasing pressure of carbon dioxide F in a gas state as an object gas for compression to pressure equal to or higher than target pressure that is higher than critical pressure.

Figure 1:
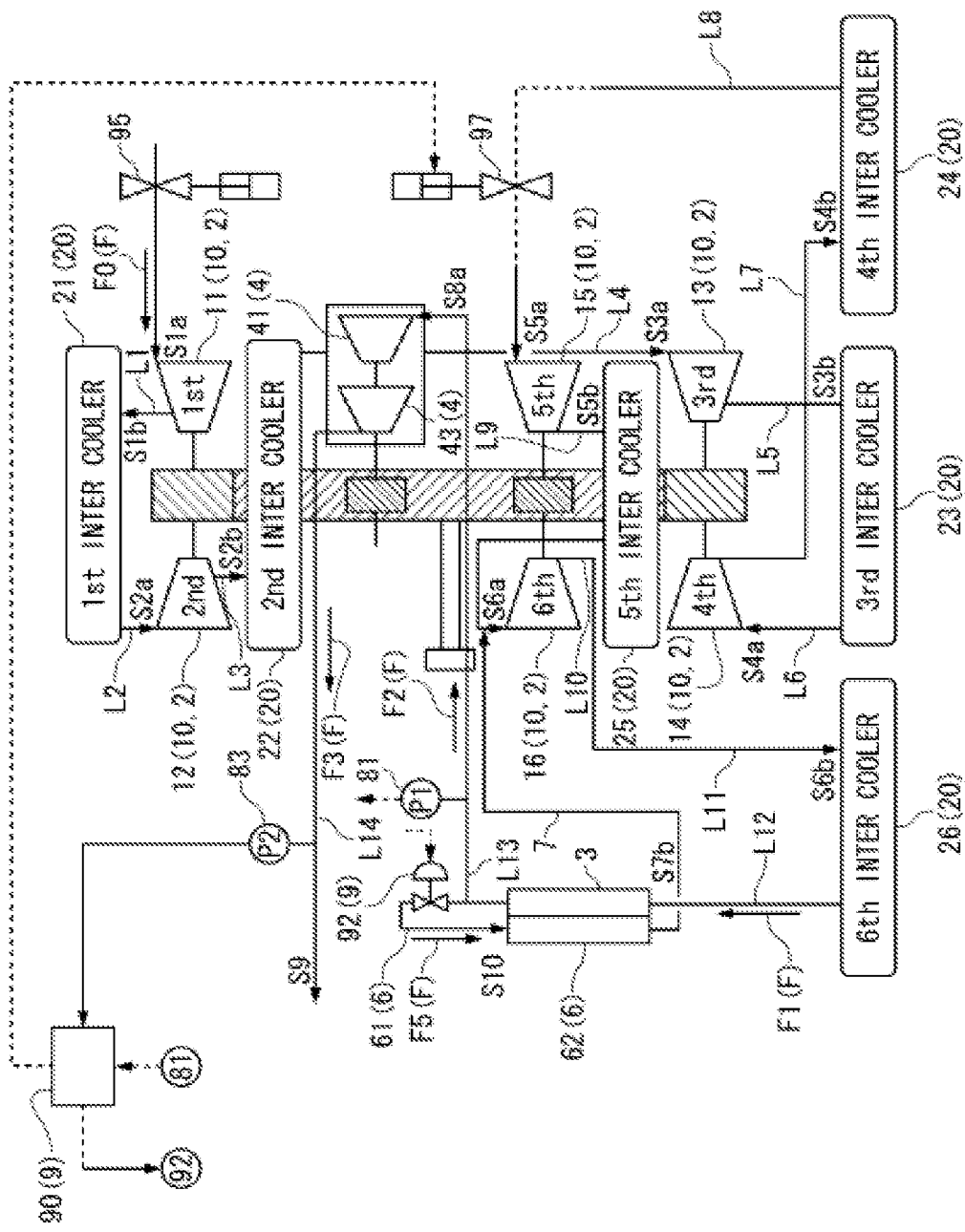
FIG. 1 is schematic system diagram of a booster system according to one or more embodiments of the present invention.

As shown in FIG. 1, the booster system 1 includes a compression unit 2 that takes in and compresses carbon dioxide F, a cooling unit 3 that cools an intermediate supercritical fluid generated by the compression unit 2 to around a critical temperature to generate an intermediate supercritical pressure liquid, and a pump unit 4 that increases pressure of the intermediate supercritical pressure liquid generated by the cooling unit 3 to pressure equal to or higher than target pressure.

The booster system 1 also includes a liquid extracting and pressure reducing unit 6 that is provided between the cooling unit 3 and the pump unit 4 to extract carbon dioxide F (an intermediate supercritical pressure liquid F2), and a bypass flow path 7 through which the carbon dioxide F from the liquid extracting and pressure reducing unit 6 is returned to the compression unit 2.

The booster system 1 includes, as a pressure detection unit 8, a first pressure sensor 81 that detects pressure (pump suction pressure P1) of carbon dioxide F on an inlet side of the pump unit 4, and a second pressure sensor 83 that detects pressure (pump discharge pressure P2) of carbon dioxide F on an outlet side of the pump unit 4. The pump suction pressure P1 is also discharge pressure of the compression unit 2. The booster system 1 also includes a flow regulating valve 92 as a flow regulating unit 9 that regulates a flow rate of the carbon dioxide F extracted by the liquid extracting and pressure reducing unit 6, and an opening degree of the flow regulating valve 92 is regulated based on the pump suction pressure P1 detected by the first pressure sensor 81 to control the discharge pressure of the compression unit 2. Specifically, the booster system 1 of one or more embodiments is characterized in that the flow regulating valve 92 controls the discharge pressure of the compression unit 2, that is, the pump suction pressure P1.

Now, components of the booster system 1 will be described, and then operations of the booster system 1 and operations/effects of the booster system 1 will be described in this order.

[Compression Unit 2]

The compression unit 2 constitutes a first compression unit in one or more embodiments of the present invention, and includes a geared compressor of a multiaxis and multistage configuration in which a plurality of impellers are interlocked via gears.

The compression unit 2 includes a plurality of impellers 10 provided in multiple stages (six stages in one or more embodiments), and a plurality of intermediate coolers 20 each provided between two consecutive impellers 10 and between an impeller 10 and the cooling unit 3. The compression unit 2 uses the taken carbon dioxide F as an introduced gas F0 and repeats compression and cooling to compress the carbon dioxide F to a pressure state at intermediate pressure equal to or higher than critical pressure and lower than target pressure to generate an intermediate supercritical fluid F1.

The critical pressure of the carbon dioxide F is 7.4 [MPa], and as the target pressure, for example, 15 [MPa] is set which is a value higher than the critical pressure. As the intermediate pressure of the intermediate supercritical fluid F1 generated by the compression unit 2, for example, 10 [MPa] is set. However, the values of the target pressure and the intermediate pressure are decided as appropriate according to the critical pressure of the object gas, and do not limit the present invention.

The compression unit 2 includes a first stage compression impeller 11, a first intermediate cooler 21, a second stage compression impeller 12, a second intermediate cooler 22, a third stage compression impeller 13, a third intermediate cooler 23, a fourth stage compression impeller 14, a fourth intermediate cooler 24, a fifth stage compression impeller 15, a fifth intermediate cooler 25, a sixth stage compression impeller 16, and a sixth intermediate cooler 26 provided in this order from an upstream side toward a downstream side of the flow of the taken carbon dioxide F. These components of the compression unit 2 are connected by flow paths L1, L2, L3, L4, L5, L6, L7, L8, L9, L10, L11 constituted by pipe devices so that the carbon dioxide F as a medium to be compressed can flow between the components.

The compression unit 2 includes a flow regulating valve 95 that regulates a flow rate of carbon dioxide F sucked into the first stage compression impeller 11, and a flow regulating valve 97 that regulates a flow rate of carbon dioxide F sucked into the fifth stage compression impeller 15. The flow regulating valve 95 and the flow regulating valve 97 are constituted by, for example, inlet guide vanes (IGV).

Although not shown, the compression unit 2 includes a device for removing water on a downstream side of the fourth intermediate cooler 24, and includes the flow regulating valve 95 on the inlet side of the first stage compression impeller 11 in order to regulate operation pressure of the water removal device. The booster system 1 includes the flow regulating valve 97 to regulate final discharge pressure. Without the water removal device, the flow regulating valve 95 associated with the first stage compression impeller 11 located most upstream is regulated to regulate the final discharge pressure of the booster system 1. In this case, the flow regulating valve 97 is omitted.

In one or more embodiments, an opening degree of the flow regulating valve 97 is regulated based on a detection result of the second pressure sensor 83, that is, the pump discharge pressure P2.

[Cooling Unit 3]

The cooling unit 3 is connected to a downstream side of the sixth intermediate cooler 26 by the flow path L12, cools the intermediate supercritical fluid F1 generated by the sixth stage compression impeller 16 as a final stage of the compression unit 2 to around a critical temperature and liquefies the intermediate supercritical fluid F1 to generate an intermediate supercritical pressure liquid F2.

The cooling unit 3 includes a heat exchanger that introduces a low temperature liquid F5 from the liquid extracting and pressure reducing unit 6 described later and uses the low temperature liquid F5 as a cooling medium to cool the intermediate supercritical fluid F1. Heat exchange in the cooling unit 3 is performed with a heat exchanger 62 in the liquid extracting and pressure reducing unit 6 described later.

When the cooling unit 3 cools the intermediate supercritical fluid F1 to around the critical temperature, cooling to a temperature of ±20[° C.] of the critical temperature is appropriate, cooling to a temperature of ±15[° C.] of the critical temperature is more appropriate, and cooling to a temperature of ±10[° C.] of the critical temperature is most appropriate.

[Pump Unit 4]

The pump unit 4 constitutes a second compression unit in one or more embodiments of the present invention. The pump unit 4 is connected to a downstream side of the cooling unit 3 by the flow path L13, introduces the intermediate supercritical pressure liquid F2 generated by passing through the cooling unit 3 and increases pressure of the intermediate supercritical pressure liquid F2 to a pressure state at target pressure to generate a target supercritical fluid F3. In one or more embodiments, the pump unit 4 adopts a two-stage configuration including a first stage pump impeller 41 and a second stage pump impeller 43. However, the pump unit 4 may adopt any configuration as long as it can increase pressure of the intermediate supercritical pressure liquid F2 to the target pressure.

As described above, the first pressure sensor 81 is provided in the flow path L13, and continuously detects pressure (pump suction pressure P1) of the intermediate supercritical pressure liquid F2 flowing through the flow path L13.

Further, the flow path L14 is connected to the downstream side of the pump unit 4. The target supercritical fluid F3 generated by compression in the pump unit 4 flows through the flow path L14, and is supplied to external equipment connected to the downstream side.

The second pressure sensor 83 is provided in the flow path L14, and continuously detects pressure (pump discharge pressure P2) of the target supercritical fluid F3 flowing through the flow path L14.

[Liquid Extracting and Pressure Reducing Unit 6]

The liquid extracting and pressure reducing unit 6 is provided between the cooling unit 3 and the pump unit 4, and uses a low temperature liquid F5 obtained by extracting a part of the intermediate supercritical pressure liquid F2 from the cooling unit 3 to cool the intermediate supercritical fluid F1 in the cooling unit 3. Heat exchange caused by the cooling heats the low temperature liquid F5 itself.

Specifically, the liquid extracting and pressure reducing unit 6 includes a branch pipe line 61 having one end connected to the flow path L13 so as to branch off from the flow path L13 between the cooling unit 3 and the pump unit 4, and a heat exchanger 62 to which the other end of the branch pipe line 61 is connected and that performs heat exchange with the cooling unit 3. Further, the flow regulating valve 92 is provided in a middle position of the branch pipe line 61, and an opening degree of the flow regulating valve 92 is regulated to increase/decrease the flow rate of the intermediate supercritical pressure liquid F2 flowing toward the heat exchanger 62. Increasing the opening degree of the flow regulating valve 92, that is, opening the flow regulating valve 92 increases the flow rate of the intermediate supercritical pressure liquid F2 flowing toward the heat exchanger 62, while reduces the flow rate of the intermediate supercritical pressure liquid F2 flowing toward the pump unit 4. Reducing the opening degree of the flow regulating valve 92, that is, closing the flow regulating valve 92 causes the opposite action. The flow regulating valve 92 constitutes a first flow regulating valve in one or more embodiments of the present invention.

[Bypass Flow Path 7]

The bypass flow path 7 returns the low temperature liquid F5 from the liquid extracting and pressure reducing unit 6 to an upstream side of the sixth stage compression impeller 16 of the compression unit 2. The bypass flow path 7 has one end connected to the heat exchanger 62 of the liquid extracting and pressure reducing unit 6, and the other end connected to the flow path L10 between the sixth stage compression impeller 16 and the fifth intermediate cooler 25.

[Pressure Detection Unit 8]

The pressure detection unit 8 includes the first pressure sensor 81 provided in the middle of the flow path L13 and the second pressure sensor 83 provided in the middle of the flow path L14. The first pressure sensor 81 measures a pressure value of the intermediate supercritical pressure liquid F2 flowing through the flow path L13, that is, the pump suction pressure P1 of the pump unit 4, and the second pressure sensor 83 measures a pressure value of the target supercritical fluid F3 flowing through the flow path L14, that is, the pump discharge pressure P2 of the pump unit 4.

The pump suction pressure P1 and the pump discharge pressure P2 measured by the pressure detection unit 8 are transmitted to a control unit 90 of a flow regulating unit 9 described later. In one or more embodiments, the pump suction pressure P1 corresponds to discharge side pressure of the compression unit 2, and the pump discharge pressure P2 corresponds to final discharge pressure of the booster system 1.

[Flow Regulating Unit 9]

The flow regulating unit 9 includes the control unit 90 to which the first pressure sensor 81 and the second pressure sensor 83 of the pressure detection unit 8 are electrically connected, and the flow regulating valve 92 and the flow regulating valve 97 each having an opening degree regulated by an instruction from the control unit 90.

The opening degree of the flow regulating valve 92 is regulated to reduce pressure of the intermediate supercritical pressure liquid F2 extracted from the flow path L13 by the Joule-Thomson effect to generate the low temperature liquid F5. The opening degree of the flow regulating valve 97 is regulated to increase/decrease the flow rate of the carbon dioxide F sucked into the fifth stage compression impeller 15. The opening degrees of the flow regulating valve 92 and the flow regulating valve 97 are controlled by the control unit 90. Although not shown, the control unit 90 is associated with the first stage compression impeller 11 located on a most upstream side of the compression unit 2, and the control unit 90 can regulate the opening degree of the flow regulating valve 95 that regulates the flow rate of the carbon dioxide F supplied into the first stage compression impeller 11.

Figure 3:
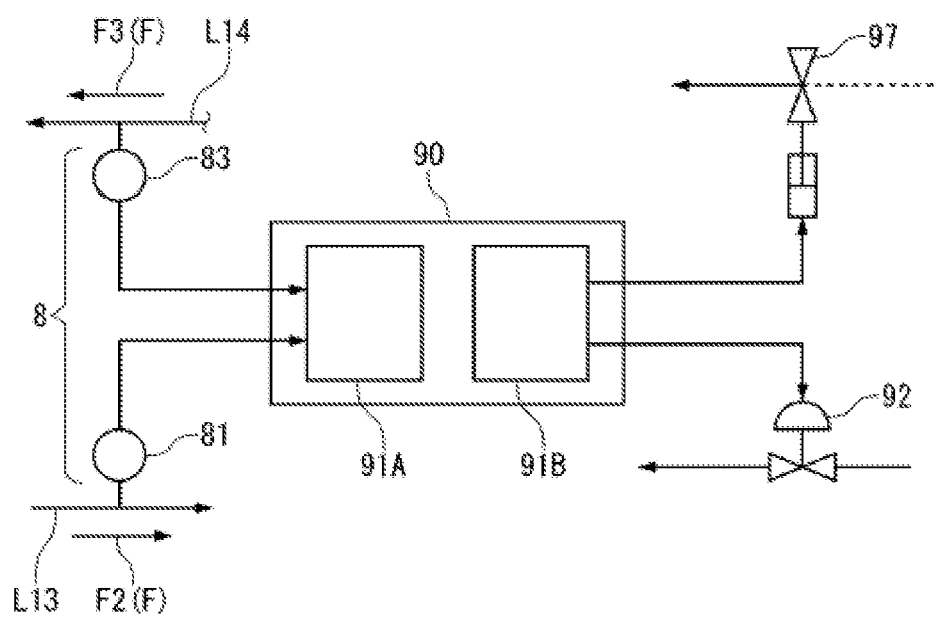
FIG. 3 shows a configuration of a control unit in connection with the booster system according to one or more embodiments.

The control unit 90 includes, for example as shown in FIG. 3, a determination unit 91A connected to the first pressure sensor 81 and the second pressure sensor 83, and an opening degree decision unit 91B connected to the determination unit 91A. The determination unit 91A includes both the first determination unit and the second determination unit in one or more embodiments of the present invention, and the opening degree decision unit 91B includes both the first opening degree decision unit and the second opening degree decision unit in one or more embodiments of the present invention.

The determination unit 91A is electrically connected to the pressure detection unit 8, and performs a determination processing whether or not the pump suction pressure P1 and the pump discharge pressure P2 as detection values of the first pressure sensor 81 and the second pressure sensor 83 of the pressure detection unit 8 fall within preset determination values Ps1, Ps2. The determination values Ps1, Ps2 are defined within a numerical range including the target pressure of the target supercritical fluid F3 generated by the booster system 1, and input to the determination unit 91A by input means (not shown), and stored and held in the determination unit 91A.

The determination unit 91A calculates difference amounts $\Delta P1$, $\Delta P2$ between the stored predetermined determination values Ps1, Ps2 and the pump suction pressure P1 and the pump discharge pressure P2 as the detection values. The determination unit 91A transfers the difference amounts $\Delta P1$, $\Delta P2$ as determination results to the opening degree decision unit 91B.

The opening degree decision unit 91B performs a predetermined calculation based on the difference amounts $\Delta P1$, $\Delta P2$ obtained from the determination unit 91A to calculate the opening degrees of the flow regulating valve 92 and the flow regulating valve 97. More specifically, first, the difference amounts $\Delta P1$, $\Delta P2$ of the pressure values and an amount of increase/decrease in the flow rate required for eliminating the difference amounts $\Delta P1$, $\Delta P2$ are obtained from a predetermined relational expression. The relational expression is empirically obtained according to performance requirements or the like of the booster system 1.

The opening degree decision unit 91B calculates the opening degrees of the flow regulating valve 92 and the flow regulating valve 97 based on the amount of increase/decrease in the flow rate obtained by the relational expression. A relationship between the amount of increase/decrease in the flow rate and the opening degrees of the flow regulating valve 92 and the flow regulating valve 97 are decided according to performance requirements or the like of the flow regulating valve used for the flow regulating valve 92.

The opening degree decision unit 91B transfers instruction information on the decided increase/decrease in the opening degree to the flow regulating valve 92 and the flow regulating valve 97. The flow regulating valve 92 and the flow regulating valve 97 having obtained the instruction information from the opening degree decision unit 91B regulate their opening degrees, that is, increase/decrease or keep the opening degrees according to the instruction information.

[State Change of Carbon Dioxide F]

Next, with reference to a P-h diagram in FIG. 2, a state change of the carbon dioxide F in the booster system 1, that is, a pressure increasing procedure of the carbon dioxide F will be described.

Figure 2:
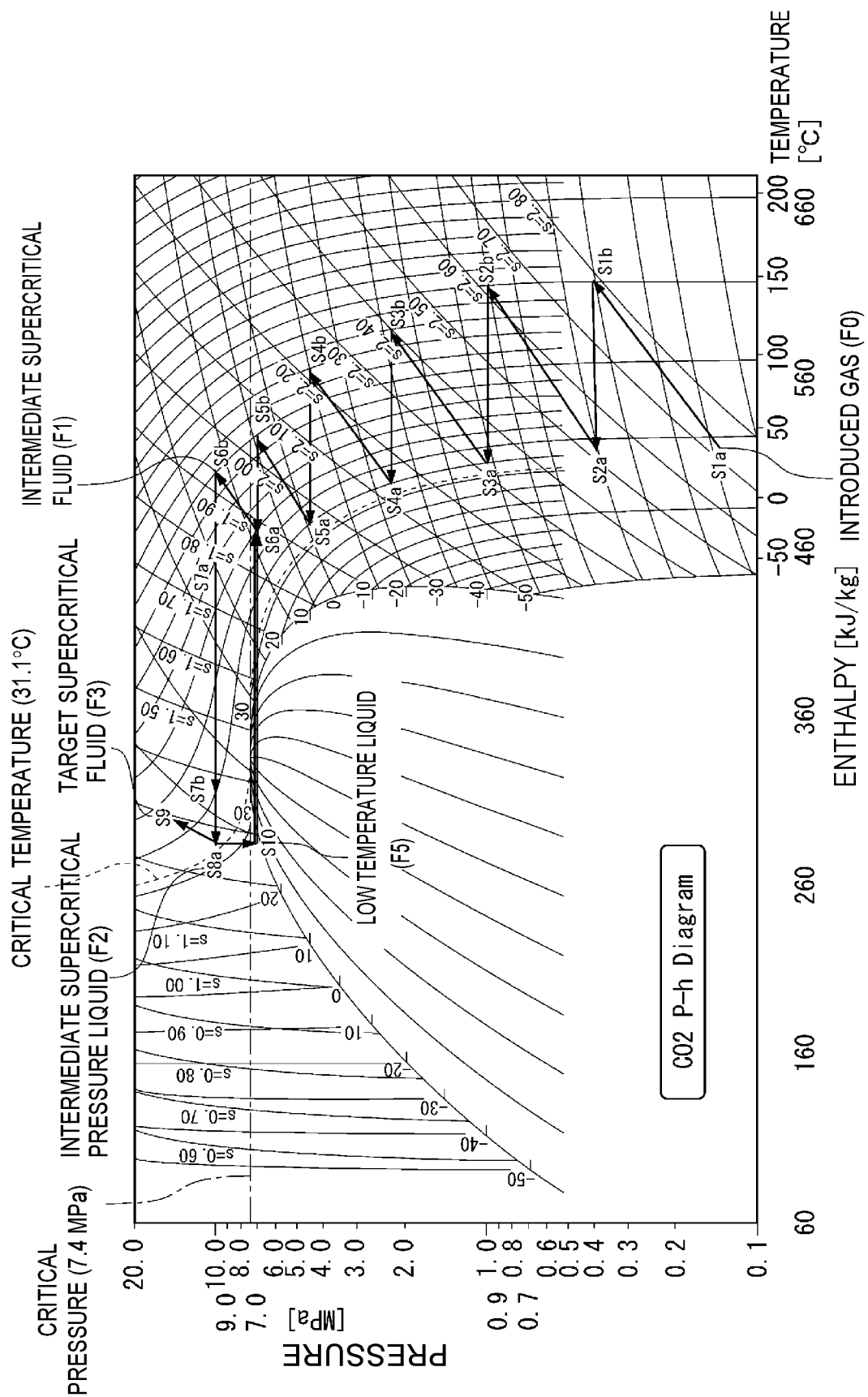
FIG. 2 is a P-h diagram showing a state of carbon dioxide in connection with the booster system according to one or more embodiments.

In the compression unit 2, the introduced gas F0 (state S1a) introduced into the first stage compression impeller 11 is compressed by the first stage compression impeller 11 as shown by a solid arrow in FIG. 2 and brought into a state S1b at higher pressure and higher temperature than the state S1a. Then, the first intermediate cooler 21 cools the gas under equal pressure, which is brought into a state S2a. Then, compression and cooling are thus repeated to cause state changes: state S2b→state S1a→state S1b→state S4a→state S4b→state S5a→state S5b→state S6a→state S6b→state S7a→state S7b, and the gas is brought into a state of the intermediate supercritical fluid F1 at pressure equal to or higher than the critical pressure (compression step).

Then, the intermediate supercritical fluid F1 in the state S7b is introduced into the cooling unit 3. The intermediate supercritical fluid F1 is cooled still at the supercritical pressure under equal pressure by the cooling unit 3, brought into a state S8a at around a critical temperature, changed in phase into the intermediate supercritical pressure liquid F2, and introduced into the pump unit 4 (cooling step).

The pump unit 4 increases pressure of the intermediate supercritical pressure liquid F2 in the state S8a to target pressure at which the intermediate supercritical pressure liquid F2 can be stored under the ground or under the seafloor, entering a final state S9 in which the carbon dioxide F can be stored under the ground or under the seafloor.

Here, a part of the intermediate supercritical pressure liquid F2 brought into the state S8a by the cooling unit 3 is extracted by opening the flow regulating valve 92 of the flow regulating unit 9. At this time, an amount of the extracted intermediate supercritical pressure liquid F2 is regulated according to the opening degree of the flow regulating valve 92. The extracted intermediate supercritical pressure liquid F2 is reduced in pressure and turns into a low temperature liquid F5 in a state S10. The pressure of the low temperature liquid F5 in the state S10 is pressure corresponding to pressure on the upstream side of the sixth stage compression impeller 16 and on the downstream side of the fifth intermediate cooler 25.

The low temperature liquid F5 is heated by heat exchange with the cooling unit 3 and vaporized still under equal pressure, and turns into a gas or a supercritical fluid in the state S6a on the upstream side of the sixth stage compression impeller 16. The gas or the supercritical fluid is returned to the upstream side of the sixth stage compression impeller 16 by the bypass flow path 7 and mixed into the intermediate supercritical fluid F1 flowing through the compression unit 2.

Now, effects of the booster system 1 according to one or more embodiments will be described.

With the booster system 1 according to one or more embodiments, carbon dioxide F is first compressed by the compression unit 2 on a front stage, and pressure on a rear stage at higher pressure is increased by the pump unit 4, thereby obtaining the target supercritical fluid F3 that can be stored under the ground or under the seafloor.

Next, with reference to FIG. 6, operations and effects of the booster system 1 will be described which are obtained by regulating the opening degree of the flow regulating valve 92 based on the detection result of the first pressure sensor 81, in other words, the flow regulating valve 92 controlling discharge pressure of the compression unit 2.

FIG. 6 chronologically shows pressure, temperatures, and valve opening degrees in respective parts when the booster system 1 is in the partial load operation and the flow rate of carbon dioxide F (flow rate of the process gas) supplied to the booster system 1 is reduced, and solid lines represent one or more embodiments.

In FIG. 6, when the flow rate of the process gas is reduced, the booster system 1 once increases the opening degree of the flow regulating valve 92 (FIG. 6 I) to reduce the flow rate into the pump unit 4, thereby trying to reduce discharge pressure of the compression unit 2 (FIG. 6 II). This increases the flow rate of the cooling medium flowing into the cooling unit 3, reduces the temperature on the inlet side of the pump unit 4 (FIG. 6 III), and increases the pump discharge pressure P2, that is, final discharge pressure of the booster system 1 (FIG. 6 IV). However, since response of a pressure change due to a flow rate change in the booster system 1 is faster than response of a temperature change in the heat exchanger that constitutes the cooling unit 3, the reduction in the pump inlet temperature has a low impact on the increase in the final discharge pressure (pump discharge pressure P2) of the booster system 1. As a result, the booster system 1 can prevent the increase in pressure and allow the final discharge pressure of the booster system 1 to be controlled to the discharge target pressure more quickly at time T1.

During this process, the flow regulating valve 97 continuously reduces the opening degree, that is, moves in a closing direction until the final discharge pressure reaches the discharge target pressure.

On the other hand, a conventional control method disclosed in Patent Literature 2 is as described below. Dashed lines in FIG. 6 represent the conventional control method.

In the conventional control method, the flow regulating valve 92 is closed (FIG. 6i) to reduce the flow rate of the cooling medium and thus increase the pump inlet temperature (FIG. 6ii), thereby trying to reduce the final discharge pressure of the booster system 1. At this time, the flow rate of the cooling medium in the cooling unit 3 is reduced, but the flow rate into the pump unit 4 is increased instead. Thus, the discharge pressure (pump suction pressure P1) of the compression unit 2 and the final discharge pressure (pump discharge pressure P2) of the booster system 1 are more likely to increase (FIG. 6iii), making it difficult to reduce the pressure. This is because response of a pressure change due to a flow rate change in the booster system 1 is faster than response of a temperature change in the heat exchanger that constitutes the cooling unit 3. As a result, as shown in FIG. 6, it takes time T2 slower than in the embodiments of the present invention to control to the discharge target pressure.

During this control process, pressure of the intermediate supercritical pressure liquid F2 is detected as needed by the first pressure sensor 81 provided in the middle position of the flow path L13. The detected pump suction pressure P1 is input to the control unit 90 of the flow regulating unit 9. The control unit 90 decides and regulates the opening degree of the flow regulating valve 92 through a predetermined calculation. The operation for regulating the opening degree is autonomously performed by the flow regulating unit 9 and the first pressure sensor 81. Thus, even if the pressure of the intermediate supercritical pressure liquid F2 varies, the opening degree of the flow regulating valve 92 is autonomously regulated according to the variation, and the pressure of the intermediate supercritical pressure liquid F2 is corrected to predetermined desired target pressure. This allows the target supercritical fluid F3 to be supplied at stable pressure.

Next, in the booster system 1, the opening degree of the flow regulating valve 97 that regulates the flow rate of the carbon dioxide F in the compression unit 2 is regulated based on the detection result of the second pressure sensor 83 provided on the outlet side of the pump unit 4.

This allows the final discharge pressure of the booster system 1 to be controlled without interfering with the opening degree of the flow regulating valve 92.

During this control process, the pressure of the target supercritical fluid F3 is detected as needed by the second pressure sensor 83 provided in the middle position of the flow path L14. The detected pump discharge pressure P2 is input to the control unit 90 of the flow regulating unit 9. The control unit 90 decides and regulates the opening degree of the flow regulating valve 97 through a predetermined calculation. The above operation is autonomously performed by the flow regulating unit 9 and the second pressure sensor 83. Thus, even if the pressure of the target supercritical fluid F3 varies due to a disturbance factor or the like, the opening degree of the flow regulating valve 97 is autonomously regulated according to the variation, and the pressure of the target supercritical fluid F3 is corrected to predetermined desired target pressure. This allows the target supercritical fluid F3 to be supplied at stable pressure.

Next, in the booster system 1, a compressor having an impeller similar to that in the compression unit 2 may be applied to a rear stage side portion at higher pressure. However, in this case, many high pressure gas seals and many compressor casings corresponding to high pressure are required. In the respect, the booster system 1 adopts the pump unit 4 on the high pressure side. The pump unit 4 increases pressure of the liquid, and thus can easily seal an object fluid during the pressure increase to a high pressure state (about 15 to 60 [MPa]), thereby avoiding an increase in cost.

Also, the cooling unit 3 cools the intermediate supercritical fluid F1 brought into a state at the critical pressure or higher by the compression unit 2, which turns into the intermediate supercritical pressure liquid F2.

As shown in the P-h diagram in FIG. 2, at pressure lower than the critical pressure, isothermal lines rise substantially in parallel with the ordinate (pressure) and an interval between the isothermal lines is narrow. On the other hand, in a transition region at the critical pressure or higher and around the critical temperature, isothermal lines are substantially parallel to the abscissa (enthalpy) and an interval between the isothermal lines is wide. Thus, in the transition region, during a state change of the carbon dioxide F under equal pressure, a larger enthalpy change occurs with a smaller temperature change.

The intermediate supercritical fluid F1 is first cooled to the transition region by water cooling or air cooling only using the sixth intermediate cooler 26. However, since the intermediate supercritical fluid F1 is in a state at the critical pressure and around the critical temperature, a large enthalpy change occurs with a small temperature change as described above, and most of cold energy required for liquefying the intermediate supercritical fluid F1 can be obtained only by water cooling or air cooling, thereby minimizing the flow rate of the cooling medium obtained by extracting the part of the intermediate supercritical fluid.

Further, the inside of the flow path L13 through which the intermediate supercritical pressure liquid F2 flows is under equal pressure. Thus, according to the opening degree of the flow regulating valve 92 of the flow regulating unit 9, the density and the temperature of the intermediate supercritical pressure liquid F2 are inversely proportional to each other. More specifically, when the control unit 90 regulates the opening degree of the flow regulating valve 92 in an increasing direction, the density of the intermediate supercritical pressure liquid F2 increases, while the temperature decreases. On the contrary, when the opening degree of the flow regulating valve 92 is regulated in a decreasing direction, the density of the intermediate supercritical pressure liquid F2 decreases, while the temperature increases.

Thus, for example, when the opening degree of the flow regulating valve 92 is regulated in the decreasing direction, the intermediate supercritical pressure liquid F2 in the state S8a introduced into the pump unit 4 increases in temperature and decreases in density, thereby entering a state (S8x).

Figure 4:
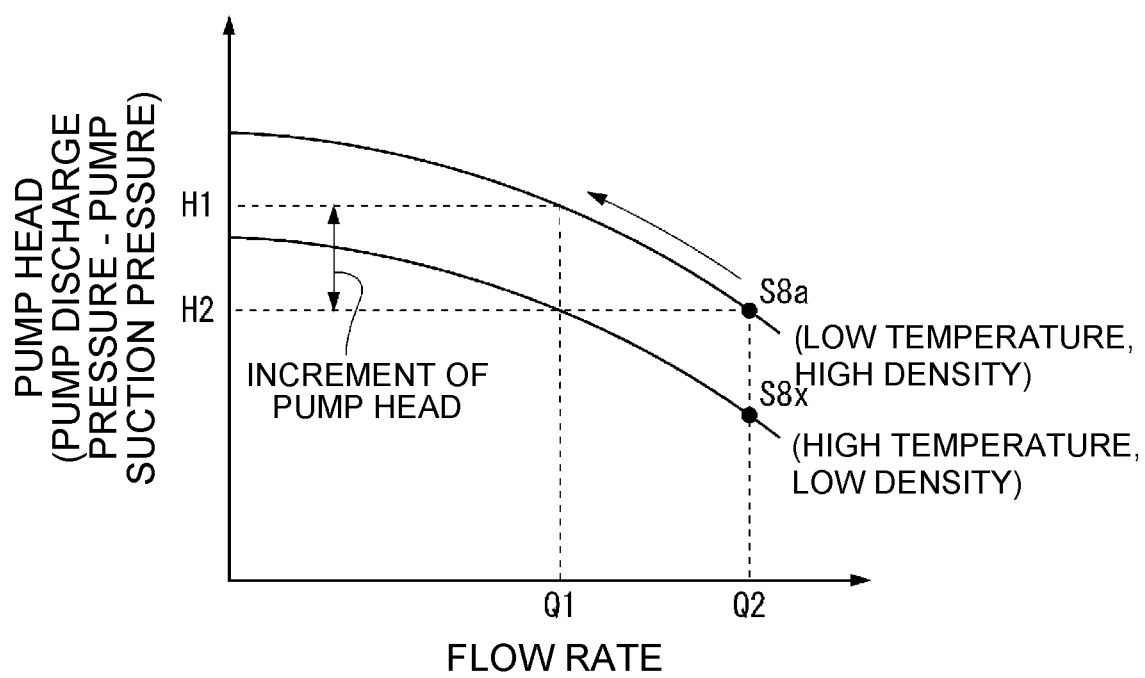
FIG. 4 is a Q-H diagram showing changes in performance property of a pump unit in response to a state of a fluid introduced into the pump unit in connection with the booster system according to one or more embodiments.

FIG. 4 is a Q-H diagram showing a relationship of differential pressure (pump head) between the pump suction pressure P1 and the pump discharge pressure P2 of the pump unit 4 with the flow rate. As show in FIG. 4, a Q-H curve of the intermediate supercritical pressure liquid F2 in the state S8x generally has a smaller pump head than a Q-H curve of the intermediate supercritical pressure liquid F2 in the state S8a. Specifically, as the temperature of the intermediate supercritical pressure liquid F2 increases and the density thereof decreases, the pressure of the target supercritical fluid F3 generated by the pump unit 4 decreases.

As such, adjusting the temperature of the intermediate supercritical pressure liquid F2 introduced into the pump unit 4 can adjust the pressure (target pressure) of the target supercritical fluid F3 finally obtained without changing a pump rotation speed or the like of the pump unit 4.

Further, as shown in FIG. 4, even under a condition at a low flow rate, adjusting the temperature of the intermediate supercritical pressure liquid F2 introduced into the pump unit 4 can adjust the pressure of the target supercritical fluid F3 finally obtained to certain target pressure without changing the pump rotation speed or the like of the pump unit 4.

This allows target pressure to be obtained without providing, for example, a variable speed motor or the like in the pump unit 4.

The booster system 1 includes the bypass flow path 7 and thus does not discharge the extracted intermediate supercritical pressure liquid F2 to the outside, thereby further improving efficiency of the entire booster system 1.

One or more embodiments adopt an IGV as means for regulating the flow rate of the introduced gas F0 introduced into the compression unit 2. The IGV is a throttle valve that is provided in a middle of a pipe line and can regulate an opening degree. As the opening degree of the IGV decreases, the flow rate of the introduced gas F0 introduced into the compression unit 2 can be reduced. In one or more embodiments, the IGVs are provided in the flow regulating valve 95 at an introducing portion of the first stage compression impeller 11 and in the flow regulating valve 97 at an introducing portion of the fifth stage compression impeller 15.

Figure 5:
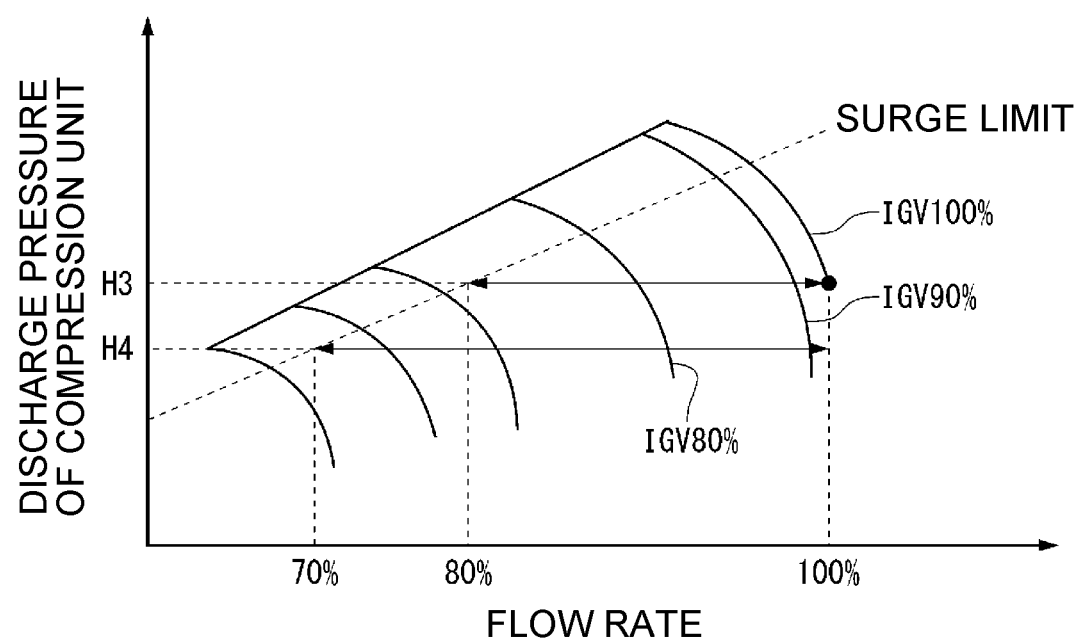
FIG. 5 is a diagram showing an opening degree of a flow regulating valve (IGV) of a compression unit and a performance property in response to a flow rate of a fluid introduced into the compression unit in connection with the booster system according to one or more embodiments.

FIG. 5 is a diagram showing a performance property in response to a change in the IGV opening degree of the compression unit 2. As can be seen from FIG. 5, as the IGV opening degree decreases from 100% as a fully open state to 90%, 80% . . . , the flow rate of the fluid introduced into the compression unit 2 decreases. At higher discharge pressure of the compression unit 2, a value of a limit flow rate at which a surge limit is reached is higher. The example in FIG. 5 shows two operation states of discharge pressure H3 and discharge pressure H4 lower than the discharge pressure H3. For the discharge pressure H3, the surge limit is reached at a flow rate of 80%, while for the discharge pressure H4, the flow rate at which the surge limit is reached is extended to 70%. Thus, the pump head of the pump unit 4 is increased at a low flow rate, thereby allowing an amount of compression required by the compression unit 2 to be reduced. This allows the discharge pressure of the compression unit 2, that is, the pressure of the intermediate supercritical fluid F1 generated by the compression unit 2 to be reduced.

As such, reducing the IGV opening degree to reduce the discharge pressure can extend an allowable flow rate range (operation range).

This can extend a flow rate range (operation range) of the target supercritical fluid F3 obtained by the booster system 1.

Embodiments of the present invention have been described above. The components listed in the above embodiments may be chosen or changed to other components without departing from the gist of the present invention as described below.

In one or more embodiments, an example of using the geared compressor for the compression unit 2 as the first compression unit has been described. However, the compressor used for the compression unit 2 is not limited to the geared compressor, but other types of compressors may be adopted. Also, an example of using the pump impeller as the second compression unit has been described, however, a compressor may be used. Also, an example in which the compression unit 2 includes the six stages of compression impellers, and the pump unit 4 includes the two stages of pump impellers has been described. However, the present invention may adopt any number of stages of impellers as long as they can accomplish their purposes, and may adopt one or more stages of impellers as appropriate. Further, the compression unit 2 and the pump unit 4 may be integrally assembled or provided separately.

In one or more embodiments, the intermediate supercritical fluid F1 generated by the compression unit 2 is cooled to the transition region to a liquid only by the sixth intermediate cooler 26, and then liquefied by the cooling unit 3 to generate the intermediate supercritical pressure liquid F2. However, the present invention is not limited to this. For example, the cooling unit 3 may be divided into a precooling unit and a main cooling unit, the precooling unit may include a heat exchanger that precools the intermediate supercritical fluid F1 using a cooling medium from outside, and the main cooling unit may include a heat exchanger that cools the intermediate supercritical fluid F1 using the low temperature liquid F5 from the liquid extracting and pressure reducing unit 6. With this configuration, precooling by the precooling unit can reduce cold energy required by the cooling unit 3.

Also, in one or more embodiments, the pump unit 4 is used to obtain the target supercritical fluid F3, however, the present invention is not limited to this. For example, a heating unit may be provided such that after the pump unit 4 generates a target pressure liquid F3', the target pressure liquid is introduced into the heating unit to generate a target supercritical fluid F3 at a critical temperature (31.1[° C.]) or higher. The heating unit may constitute a heat exchanger, for example, together with the cooling unit 3, and may heat the target pressure liquid F3' with condensation heat obtained by the cooling unit 3 cooling the intermediate supercritical fluid F1 to obtain the target supercritical fluid F3.

Also, in one or more embodiments, the opening degree of the flow regulating valve 97 (second flow regulating valve) that regulates the flow rate of the carbon dioxide F sucked into the fifth stage compression impeller 15 is regulated based on the pump discharge pressure P2 as the detection result of the second pressure sensor 83, but the present invention is not limited to this. Specifically, the second flow regulating valve in the present invention may be provided in association with the compressor located most upstream (first stage compression impeller) or provided in association with any compressor located downstream of the most upstream position with reference to the flow direction of the object gas for compression.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1 booster system
2 compression unit
2 Patent Literature
3 cooling unit
4 pump unit
6 liquid extracting and pressure reducing unit
7 bypass flow path
8 pressure detection unit
9 flow regulating unit
10 impeller
11 first stage compression impeller
12 second stage compression impeller
13 third stage compression impeller
14 fourth stage compression impeller
15 fifth stage compression impeller
16 sixth stage compression impeller
20 intermediate cooler
21 first intermediate cooler
22 second intermediate cooler
23 third intermediate cooler
24 fourth intermediate cooler
25 fifth intermediate cooler
26 sixth intermediate cooler
41 first stage pump impeller
43 second stage pump impeller
61 branch pipe line
62 heat exchanger
81 first pressure sensor
83 second pressure sensor
90 control unit
91A determination unit
91B opening degree decision unit
92 flow regulating valve
95 flow regulating valve
97 flow regulating valve

The invention claimed is:

1. A booster system for increasing pressure of an object gas to pressure equal to or higher than target pressure that is higher than critical pressure, comprising:
a first compression unit that:
has a multistage configuration in which a plurality of impellers are interlocked with one another, and
compresses the object gas to intermediate pressure equal to or higher than the critical pressure and lower than the target pressure and generates an intermediate supercritical fluid;
a heat exchanger that cools the intermediate supercritical fluid with a cooling medium and generates an intermediate supercritical pressure liquid;
a liquid extracting and pressure reducing unit that extracts a part of the intermediate supercritical pressure liquid;
a first flow regulating valve that regulates a flow rate of the extracted part of the intermediate supercritical pressure liquid when supplied into the heat exchanger, wherein the extracted part of the intermediate supercritical pressure liquid serves as the cooling medium;
a second flow regulating valve that regulates a suction flow rate of the object gas sucked into one of the impellers of the first compression unit;
a second compression unit that increases pressure of the rest of the intermediate supercritical pressure liquid to be equal to or higher than the target pressure;
a first pressure sensor that detects pressure of the intermediate supercritical pressure liquid on an inlet side of the second compression unit; and
a second pressure sensor that detects pressure on an outlet side of the second compression unit,
wherein the object gas is carbon dioxide,
wherein an opening degree of the first flow regulating valve is regulated based on a detection result of the first pressure sensor, and
wherein an opening degree of the second flow regulating valve is regulated based on a detection result of the second pressure sensor.

2. The booster system according to claim 1, further comprising a first controller that controls the opening degree of the first flow regulating valve based on the detection result of the first pressure sensor, wherein
the first controller determines whether the detection result of the first pressure sensor falls within a predetermined pressure range, and decides the opening degree of the first flow regulating valve based on the determination.

3. The booster system according to claim 1, further comprising a second controller that controls the opening degree of the second flow regulating valve based on the detection result of the second pressure sensor, wherein
the second controller determines whether the detection result of the second pressure sensor falls within a predetermine pressure range, and decides the opening degree of the second flow regulating valve based on the determination.

4. The booster system according to claim 1, wherein
the second compression unit includes one or more stages of pumps or compressors.

5. The booster system according to claim 1, wherein the second compression unit increases pressure of the intermediate supercritical pressure liquid and generates a target supercritical fluid.

6. The booster system according to claim 1, wherein the first flow regulating valve reduces pressure of the extracted part of the intermediate supercritical fluid and generates a liquid or gas-liquid two-phase cooling medium.

7. The booster system according to claim 1, further comprising a bypass flow path through which the cooling medium is returned to the first compression unit.

8. The booster system according to claim 1, comprising a first controller that controls the opening degree of the first flow regulating valve based on the detection result of the first pressure sensor,
wherein the first controller determines whether the detection result of the first pressure sensor falls within a predetermined pressure range, and decides the opening degree of the first flow regulating valve based on the determination.

9. The booster system according to claim 2, comprising a second controller that controls the opening degree of the second flow regulating valve based on the detection result of the second pressure sensor,
wherein the second control unit determines whether the detection result of the second pressure sensor falls within a predetermine pressure range, and decides the opening degree of the second flow regulating valve based on the determination.

10. The booster system according to claim 1, wherein
the second compression unit includes one or more stages of pumps or compressors.

11. The booster system according to claim 1, wherein the second compression unit increases pressure of the intermediate supercritical pressure liquid and generates a target supercritical fluid.

12. The booster system according to claim 1, wherein the first flow regulating valve reduces pressure of the extracted part of the intermediate supercritical fluid and generates a liquid or gas-liquid two-phase cooling medium.

13. The booster system according to claim 1, comprising a bypass flow path through which the cooling medium is returned to the first compression unit.

14. The booster system according to claim 1, wherein
the second flow regulating valve is provided on the impeller located most upstream in a flow direction of the object gas.

15. The booster system according to claim 2, wherein
the second flow regulating valve is provided on the impeller located most upstream in a flow direction of the object gas.

16. The booster system according to claim 1, wherein
the plurality of impellers includes first to sixth stage compression impellers disposed in this order toward downstream of the flow of the object gas, and
the second flow regulating valve regulates the suction flow rate of the object gas sucked into the fifth stage compression impeller.

* * * * *